United States Patent
Neuman et al.

(10) Patent No.: US 9,137,513 B2
(45) Date of Patent: Sep. 15, 2015

(54) METHOD AND SYSTEM FOR MIXING VIDEO AND GRAPHICS

(75) Inventors: Darren Neuman, Palo Alto, CA (US); Jason Herrick, Pleasanton, CA (US); Qinghua Zhao, Cupertino, CA (US); Christopher Payson, Bolton, MA (US)

(73) Assignee: BROADCOM CORPORATION, Irvine, CA (US)

( * ) Notice: Subject to any disclaimer, the term of this patent is extended or adjusted under 35 U.S.C. 154(b) by 755 days.

(21) Appl. No.: 12/962,995

(22) Filed: Dec. 8, 2010

(65) Prior Publication Data

US 2011/0134216 A1    Jun. 9, 2011

Related U.S. Application Data

(60) Provisional application No. 61/267,729, filed on Dec. 8, 2009, provisional application No. 61/296,851, filed on Jan. 20, 2010, provisional application No. 61/330,456, filed on May 3, 2010.

(51) Int. Cl.
*H04N 13/00*    (2006.01)

(52) U.S. Cl.
CPC ...... *H04N 13/0029* (2013.01); *H04N 2213/007* (2013.01)

(58) Field of Classification Search
CPC ............... H04N 13/0029; H04N 2213/007
USPC ............................................. 348/43; 386/95
See application file for complete search history.

(56) References Cited

U.S. PATENT DOCUMENTS

| | | | | |
|---|---|---|---|---|
| 8,330,801 | B2* | 12/2012 | Wang et al. | 348/46 |
| 2007/0058937 | A1* | 3/2007 | Ando et al. | 386/95 |
| 2008/0010648 | A1* | 1/2008 | Ando et al. | 719/328 |
| 2009/0315979 | A1* | 12/2009 | Jung et al. | 348/43 |
| 2011/0032330 | A1* | 2/2011 | Kim et al. | 348/43 |
| 2011/0134218 | A1* | 6/2011 | Neuman et al. | 348/43 |
| 2011/0157309 | A1* | 6/2011 | Bennett et al. | 348/43 |
| 2011/0164111 | A1* | 7/2011 | Karaoguz et al. | 348/43 |
| 2011/0267425 | A1* | 11/2011 | Kim et al. | 348/43 |
| 2011/0273534 | A1* | 11/2011 | Luthra et al. | 348/43 |
| 2011/0293240 | A1* | 12/2011 | Newton et al. | 386/230 |
| 2012/0287234 | A1* | 11/2012 | Kim | 348/43 |

* cited by examiner

*Primary Examiner* — Christopher S Kelley
*Assistant Examiner* — Asmamaw G Tarko
(74) *Attorney, Agent, or Firm* — Oblon, McClelland, Maier & Neustadt, L.L.P.

(57) ABSTRACT

A method and system are provided in which a video processor may select a 2D video output format or a 3D video output format. The video processor may generate composited video data by combining video data from a video source, and one or both of video data from additional video sources and graphics data from graphics source(s). The video processor may select the order in which such combination is to occur. The video data from the various video sources may comprise one or both of 2D video data and 3D video data. The graphics data from the graphics sources may comprise one or both of 2D graphics data and 3D graphics data. The video processor may perform 2D-to-3D and/or 3D-to-2D format conversion when appropriate to generate the composited video data in accordance with the selected output video format.

20 Claims, 16 Drawing Sheets

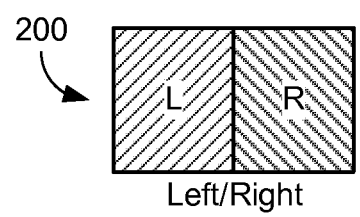
Left/Right
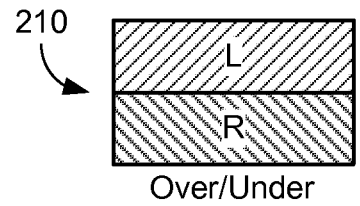
Over/Under
*Fig. 2*

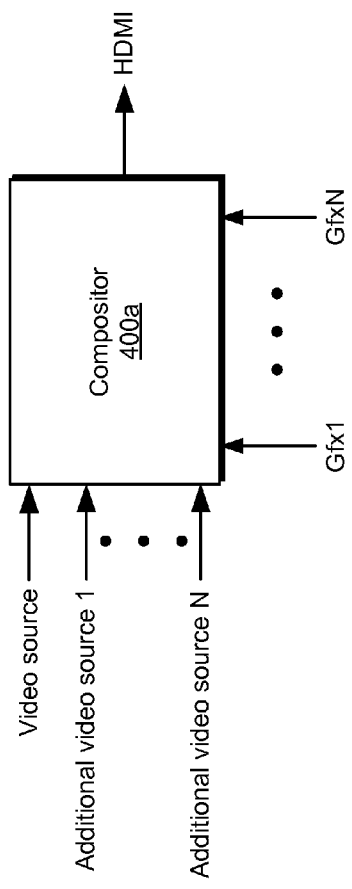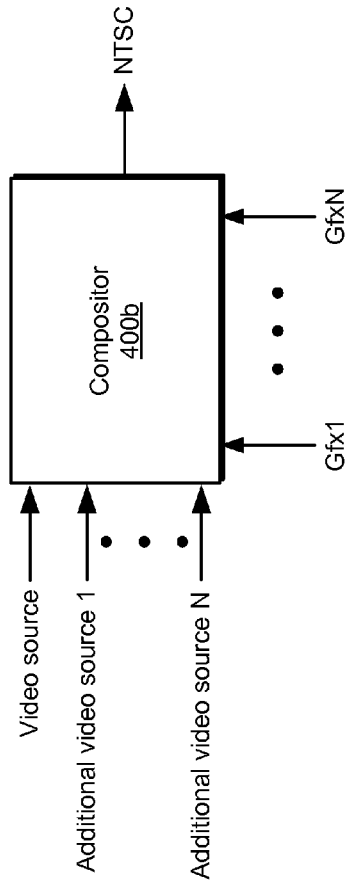

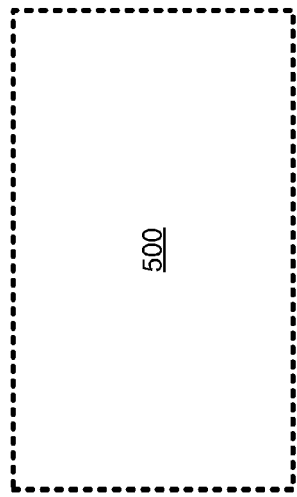
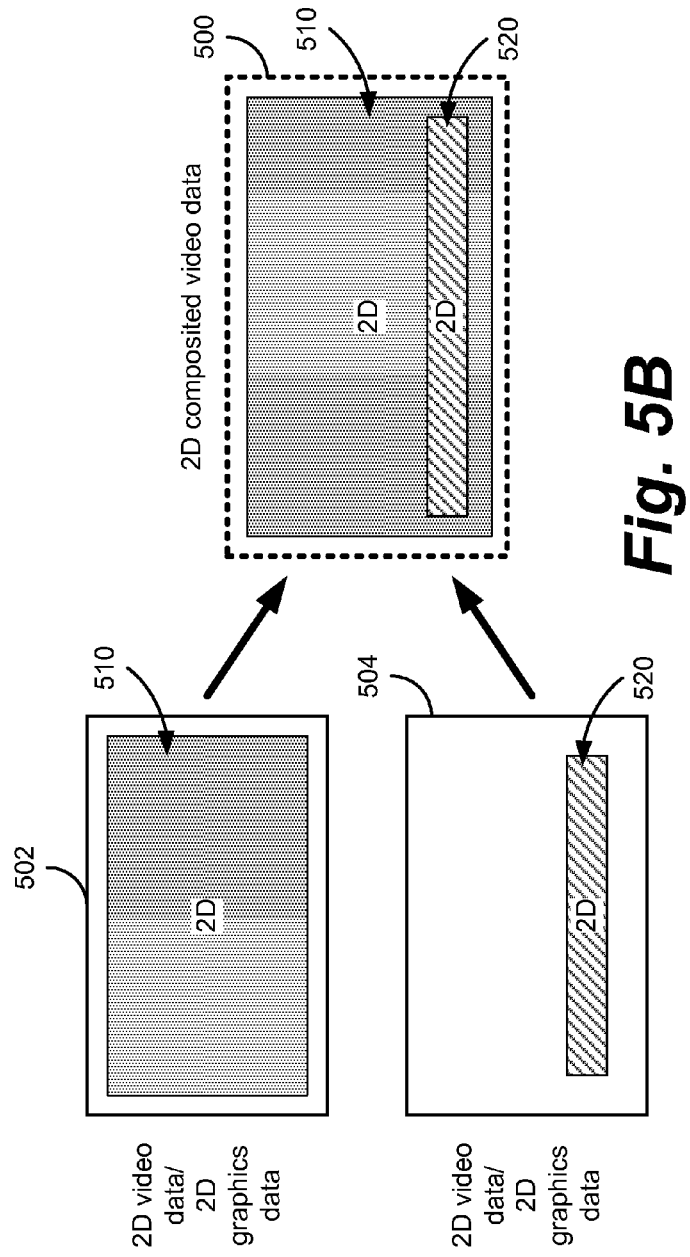

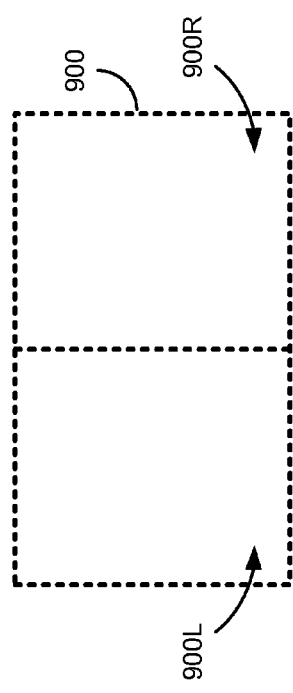
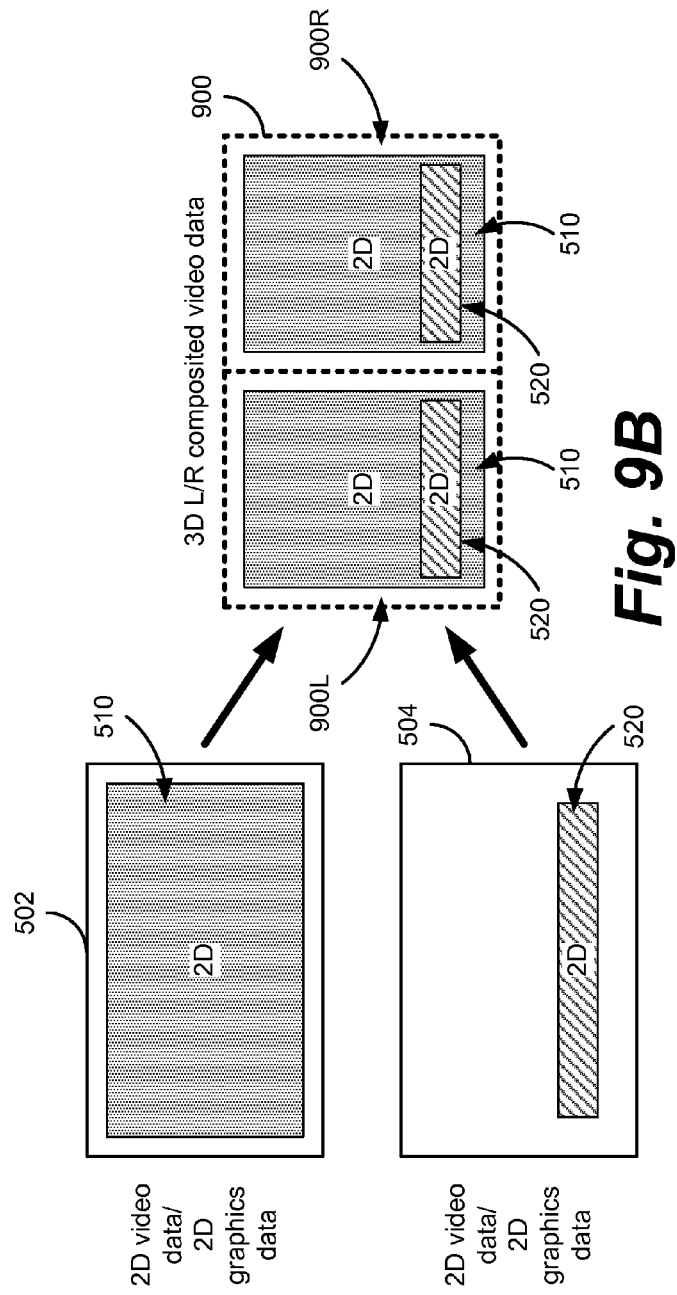

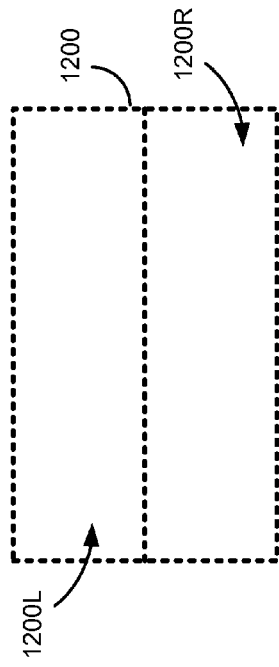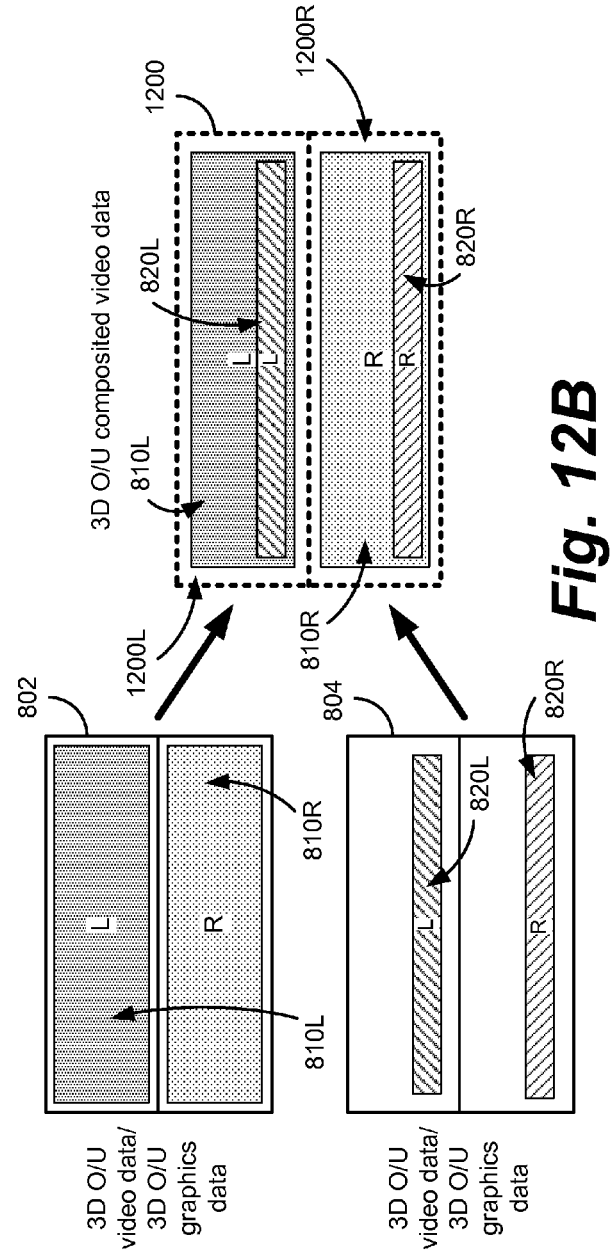

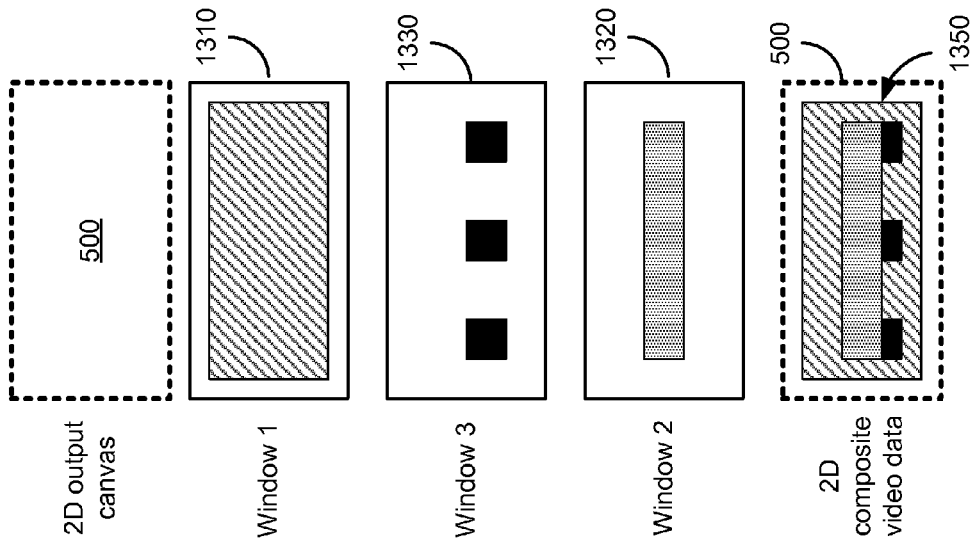
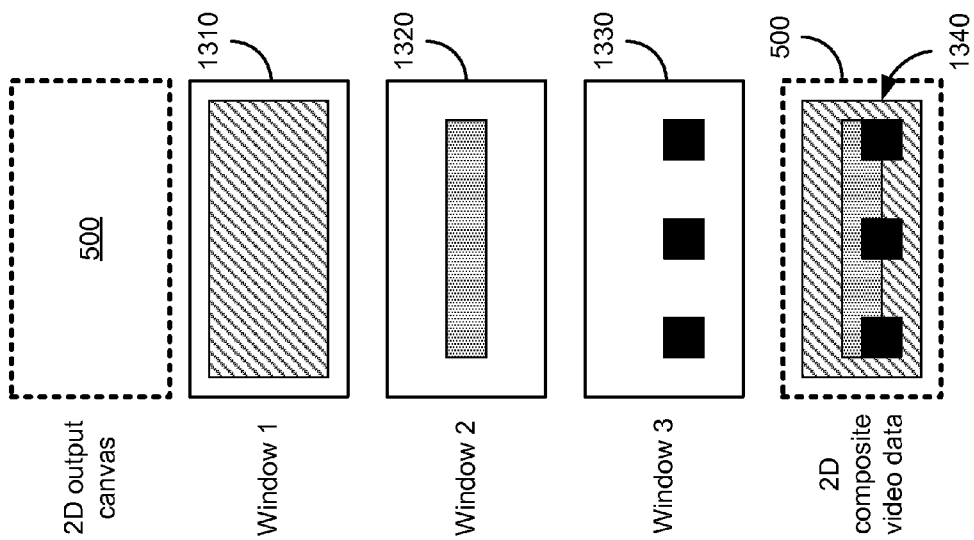

METHOD AND SYSTEM FOR MIXING VIDEO AND GRAPHICS

CROSS-REFERENCE TO RELATED APPLICATIONS/INCORPORATION BY REFERENCE

This application makes reference to, claims priority to, and claims the benefit of:
U.S. Provisional Patent Application Ser. No. 61/267,729 filed on Dec. 8, 2009;
U.S. Provisional Patent Application Ser. No. 61/296,851 filed on Jan. 20, 2010; and
U.S. Provisional Patent Application Ser. No. 61/330,456 filed on May 3, 2010.
U.S. patent application Ser. No. 12/963,212, filed on Dec. 8, 2010;
U.S. patent application Ser. No. 12/963,014, filed on Dec. 8, 2010;
U.S. patent application Ser. No. 12/963,035, filed on Dec. 8, 2010; and
U.S. patent application Ser. No. 12/963,320, filed on Dec. 8, 2010.

Each of the above referenced applications is hereby incorporated herein by reference in its entirety.

FIELD OF THE INVENTION

Certain embodiments of the invention relate to the processing of video and graphics. More specifically, certain embodiments of the invention relate to a method and system for mixing video and graphics.

BACKGROUND OF THE INVENTION

The availability and access to video content and graphics content continues to grow. Such growth has brought about challenges regarding the handling of video content and/or graphics content from different types of sources and/or the reproduction of video content and/or graphics content on different types of displays.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for mixing video and graphics, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 2 is a diagram that illustrates various packing schemes for 3D video data and 3D graphics data, in accordance with embodiments of the invention.

FIGS. 4A and 4B are block diagrams that illustrate exemplary compositors for mixing video data and/or graphics data, in accordance with embodiments of the invention.

FIGS. 5A and 5B are diagrams that illustrate a 2D canvas in which to generate 2D composited video data from 2D data, in accordance with embodiments of the invention.

FIGS. 9A and 9B are diagrams that illustrate a 3D L/R canvas in which to generate 3D L/R composited video data from 2D data, in accordance with embodiments of the invention.

FIGS. 12A and 12B are diagrams that illustrate a 3D O/U canvas in which to generate 3D O/U composited video data from 3D O/U data, in accordance with embodiments of the invention.

FIGS. 13A and 13B are diagrams that illustrate the mapping of video data and/or graphics data to one or more windows and the ordering of such windows in a compositor to generate 2D composited video data, in accordance with embodiments of the invention.

DETAILED DESCRIPTION OF THE INVENTION

Certain embodiments of the invention may be found in a method and system for mixing video and graphics. Various embodiments of the invention comprise a video processor that may select an output format from a two-dimensional (2D) video output format and a three-dimensional (3D) video output format. The video processor may generate composited video data by combining video data from a video source and video data from additional video sources and/or graphics data from graphics sources. The video processor may select the order in which such combination is to occur. The video data from the various video sources may comprise one or both of 2D video data and 3D video data. Similarly, the graphics data from the graphics sources may comprise one or both of 2D graphics data and 3D graphics data. The video processor may perform 2D-to-3D format conversion and/or 3D-to-2D format conversion when appropriate to generate the composited video data in accordance with the video output format selected.

Figure 1:
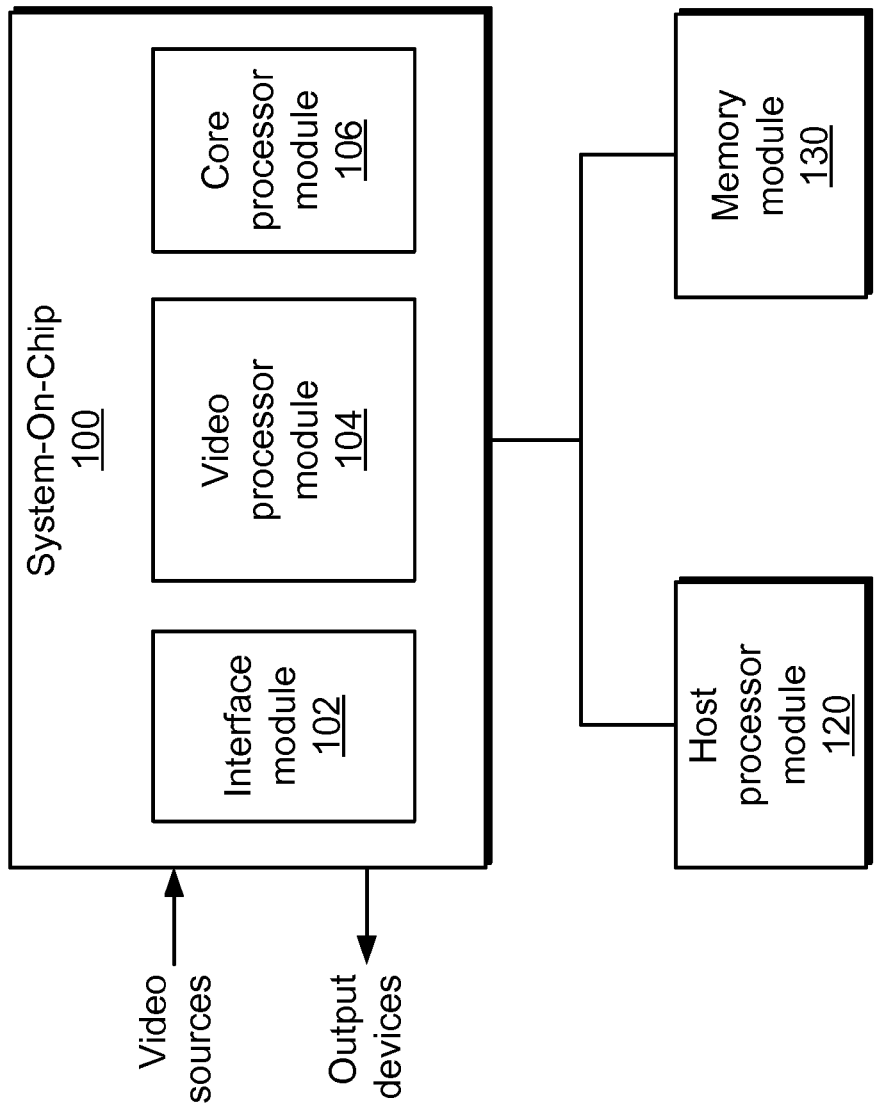
FIG. 1 is a block diagram that illustrates a system-on-chip that is operable to mix video and graphics, in accordance with an embodiment of the invention.

FIG. 1 is a block diagram that illustrates a system-on-chip (SoC) that is operable to mix video and graphics, in accordance with an embodiment of the invention. Referring to FIG. 1, there is shown an SoC 100, a host processor module 120, and a memory module 130. The SoC 100 may comprise suitable logic, circuitry, code, and/or interfaces that may be operable to receive and/or process one or more signals that comprise video content, including 3D video content. Examples of signals comprising video content that may be received and processed by the SoC 100 include, but need not be limited to, composite, blanking, and sync (CVBS) signals, separate video (S-video) signals, high-definition multimedia interface (HDMI) signals, component signals, personal computer (PC) signals, source input format (SIF) signals, and red, green, blue (RGB) signals. Such signals may be received by the SoC 100 from one or more video sources communicatively coupled to the SoC 100. The SoC 100 may also be operable to receive and/or process graphics content from one or more sources of such content. For example, the SoC 100 may receive graphics content, which may include 3D graphics content, from a graphics processor (not shown). In this regard, the graphics data may be stored in memory and retrieved from memory by the SoC 100 for processing.

The SoC 100 may generate one or more output signals that may be provided to one or more output devices for display, reproduction, and/or storage. For example, output signals from the SoC 100 may be provided to display devices such as cathode ray tubes (CRTs), liquid crystal displays (LCDs), plasma display panels (PDPs), thin film transistor LCDs (TFT-LCDs), plasma, light emitting diode (LED), Organic LED (OLED), or other flatscreen display technology. The characteristics of the output signals, such as pixel rate, resolution, and/or whether the output format is a 2D output format or a 3D output format, for example, may be based on the type of output device to which those signals are to be provided.

The host processor module 120 may comprise suitable logic, circuitry, code, and/or interfaces that may be operable to control and/or configure the operation of the SoC 100. For example, parameters and/or other information, including but not limited to configuration data, may be provided to the SoC 100 by the host processor module 120 at various times during the operation of the SoC 100. The memory module 130 may comprise suitable logic, circuitry, code, and/or interfaces that may be operable to store information associated with the operation of the SoC 100. For example, the memory module 130 may store intermediate values that result during the processing of video data, including those values associated with 3D video data processing. Moreover, the memory module 130 may store graphics data that may be retrieved by the SoC 100 for mixing with video data. For example, the graphics data may comprise 2D graphics data and/or 3D graphics data for mixing with video data in the SoC 100.

The SoC 100 may comprise an interface module 102, a video processor module 104, and a core processor module 106. The SoC 100 may be implemented as a single integrated circuit comprising the components listed above. The interface module 102 may comprise suitable logic, circuitry, code, and/or interfaces that may be operable to receive multiple signals that comprise video content and/or graphics content. Similarly, the interface module 102 may be operable to communicate one or more signals comprising video content to output devices communicatively coupled to the SoC 100. For example, when the SoC 100 generates composited video data by combining video data and/or graphics data, one or more signals that are provided by the interface module 102 to an output device may comprise the composited video data. The composited video data may have different video output formats based on the type of output device.

The video processor module 104 may comprise suitable logic, circuitry, code, and/or interfaces that may be operable to process video data, and/or graphics data. The video processor module 104 may be operable to support multiple formats for video data and/or graphics data, including multiple input formats and/or multiple output formats. The video processor module 104 may be operable to perform various types of operations on 2D video data, 3D video data, 2D graphics data, and/or 3D graphics data, including but not limited to selectively mixing such data. In some embodiments, when the video content comprises audio data, the video processor module 104, and/or another module in the SoC 100, may be operable to handle the audio data.

The core processor module 106 may comprise suitable logic, circuitry, code, and/or interfaces that may be operable to control and/or configure the operation of the SoC 100. For example, the core processor module 106 may be operable to control and/or configure operations of the SoC 100 that are associated with processing video content and/or and graphics content. In some embodiments of the invention, the core processor module 106 may comprise memory (not shown) that may be utilized in connection with the operations performed by the SoC 100. For example, the core processor module 106 may comprise memory that may be utilized during the processing of video data and/or graphics data by the video processor module 104.

In operation, the SoC 100 may receive video data from one or more sources and may process the video data in the video processor module 104. For example, the SoC 100 may perform format conversion, scaling, filtering, deinterlacing, and/or other operations on the video data. The SoC 100 may also receive graphics data from one or more graphics sources. In this regard, the graphics data may be stored in the memory module 130 from which it is retrieved by the SoC 100 for processing by the video processor module 104. The graphics data may be stored in a dynamic random access memory (DRAM) that may be part of the memory module 130 and/or of the core processor module 106, for example.

The SoC 100 may select an output format from a 2D video output format and a 3D video output format. Based on the output format selected, the video processor module 104 may generate composited video data by combining or mixing the video data from one video source with the video data from one or more additional video sources and/or with the graphics data from one or more graphics sources. The video processor module 104 may select the order in which such combination is to occur. The video data from the various video sources may comprise 2D video data and/or 3D video data. Similarly, the graphics data from the graphics sources may comprise 2D graphics data and/or 3D graphics data. Once the composited video data is generated, it may be communicated to one or more output devices by the SoC 100.

As indicated above, the SoC 100 may be operable to support multiple formats for video data and/or graphics data. The complexity of the SoC 100, however, may increase significantly the larger the number formats supported. An approach that may simplify the SoC 100, and that may enable support for a large number of formats, is to convert input formats to a native set of formats that are utilized by the SoC for processing video data and/or graphics data. A conversion from one of the native set of formats to one of multiple output formats may also be performed when and if appropriate. The native set of formats described above for video data and/or graphics data may relate to both 3D data and 2D data. Below are described examples of formats or data packing schemes that may be utilized by the SoC 100 in connection with the handling of 3D video data and/or 3D graphics data. These examples are not exhaustive, and are provided merely by way of illustration.

FIG. 2 is a diagram that illustrates various packing schemes for 3D video data and 3D graphics data, in accordance with an embodiment of the invention. Referring to FIG. 2 there is shown a first packing scheme or first format 200 for 3D data, which may be utilized with 3D video data and/or with 3D graphics data. Also shown is a second packing scheme or second format 210 for 3D data, which may also be utilized with 3D video data and/or with 3D graphics data. Each of the first format 200 and the second format 210 illustrates the arrangement of the left eye content (L) and the right eye content (R) in a 3D picture. The left eye content may also be referred to as a left 3D picture and the right eye content may also be referred to as a right 3D picture. In this regard, a 3D picture may correspond to a 3D frame or a 3D field in a video sequence, whichever is appropriate. The L and R portions in the first format 200 are arranged in a side-by-side arrangement, which is typically referred to as a left-and-right (L/R) format. The L and R portions in the second format 210 are arranged in a top-and-bottom arrangement, which is typically referred to as an over-and-under (O/U) format. Another arrangement, one not shown in FIG. 2, may be one in which the L portion is in a first 3D picture and the R portion is in a second 3D picture. Such arrangement may be referred to as a sequential format because the 3D pictures are processed and/or handled sequentially.

Both the first format 200 and the second format 210 may be utilized as native formats by the SoC 100 to process 3D video data and/or 3D graphics data. The SoC 100 may also be operable to process 3D video data and/or 3D graphics data in the sequential format, which may be typically handled by the SoC 100 in a manner that is substantially similar to the handling of the second format 210. The SoC 100 may also support converting from the first format 200 to the second format 210 and converting from the second format 210 to the first format 200. Such conversion may be associated with various operations performed by the SoC 100, including but not limited to the mixing of video and graphics. The SoC 100 may support additional native formats other than the first format 200, the second format 210, and the sequential format, for example.

Figure 3:
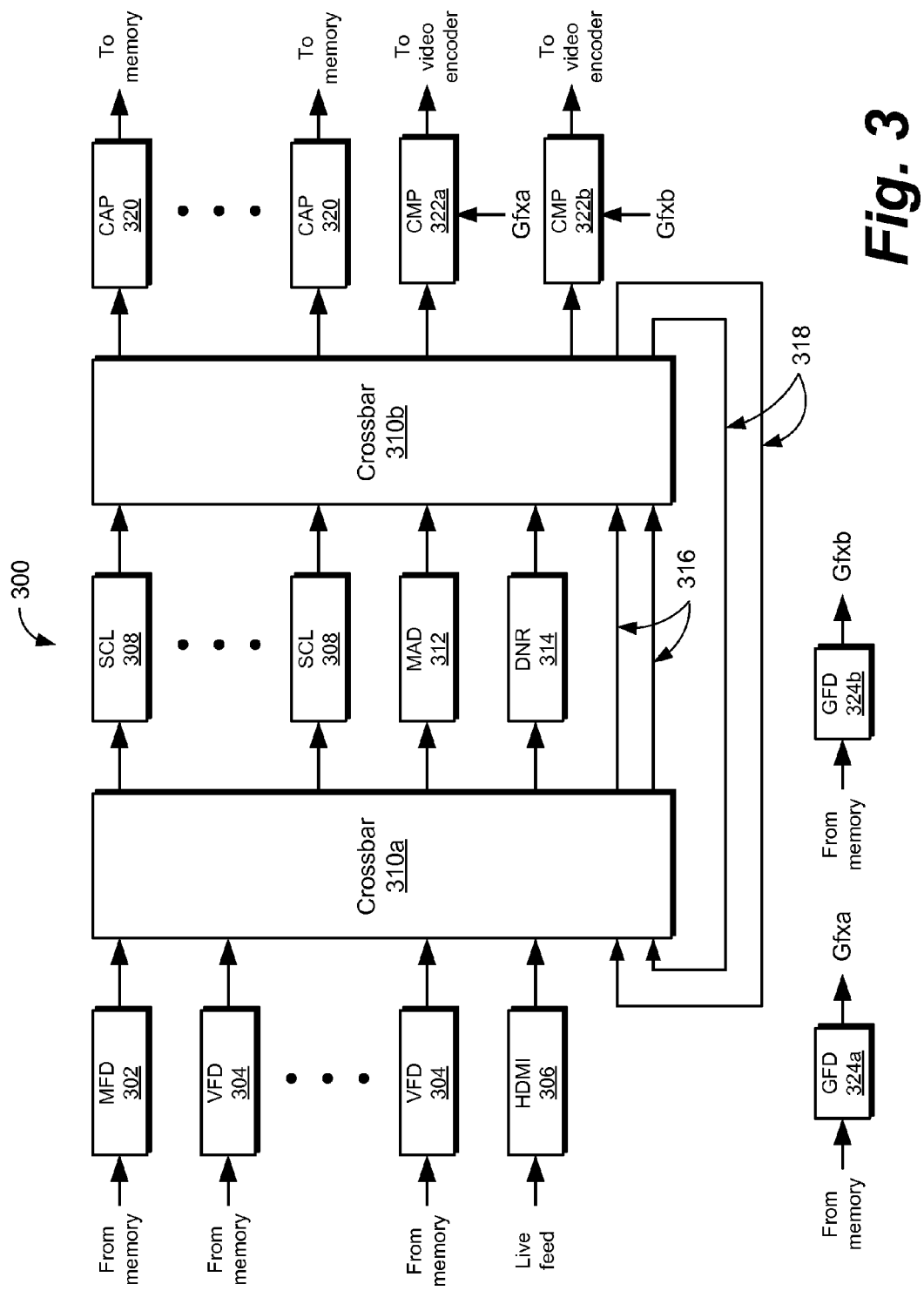
FIG. 3 is a block diagram that illustrates a processing network that is operable to handle video data and/or graphics data, in accordance with an embodiment of the invention.

FIG. 3 is block diagram that illustrates a processing network that is operable to handle video data and/or graphics data, in accordance with an embodiment of the invention. Referring to FIG. 3, there is shown a processing network 300 that may be part of the video processor module 104 in the SoC 100, for example. The processing network 300 may comprise suitable logic, circuitry, code, and/or interfaces that may be operable to route and process video data. In this regard, the processing network 300 may comprise multiple devices, components, modules, blocks, circuits, or the like, that may be selectively interconnected to enable the routing and processing of video data. The various devices, components, modules, blocks, circuits, or the like in the processing network 300 may be dynamically configured and/or dynamically interconnected during the operation of the SoC 100 through one or more signals generated by the core processor module 106 and/or by the host processor module 120. In this regard, the configuration and/or the selective interconnection of various portions of the processing network 300 may be performed on a picture-by-picture basis when such an approach is appropriate to handle varying characteristics of the video data.

The processing network 300 may be operable to route and process graphics data. For example, the processing network 300 may be operable to combine or mix video data, which may be 2D video data and/or 3D video data, with graphics data, which may be 2D graphics data and/or 3D graphics data.

In the embodiment of the invention described in FIG. 3, the processing network 300 may comprise an MPEG feeder (MFD) module 302, multiple video feeder (VFD) modules 304, an HDMI module 306, crossbar modules 310*a* and 310*b*, multiple scaler (SCL) modules 308, a motion-adaptive deinterlacer (MAD) module 312, a digital noise reduction (DNR) module 314, multiple capture (CAP) modules 320, compositor (CMP) modules 322*a* and 322*b*, and graphics feeder (GFD) modules 324*a* and 324*b*. The references to a memory (not shown) in FIG. 3 may be associated with a DRAM utilized by the processing network 300 to handle storage of video data and/or graphics data during various operations. Such DRAM may be part of the memory module 130 described above with respect to FIG. 1. In some instances, the DRAM may be part of memory embedded in the SoC 100. The references to a video encoder (not shown) in FIG. 3 may be associated with hardware and/or software in the SoC 100 that may be utilized after the processing network 300 to further process video data for communication to an output device, such as a display device, for example.

Each of the crossbar modules 310*a* and 310*b* may comprise multiple input ports and multiple output ports. The crossbar modules 310*a* and 310*b* may be configured such that any one of the input ports may be connected to one or more of the output ports. The crossbar modules 310*a* and 310*b* may enable pass-through connections 316 between one or more output ports of the crossbar module 310*a* and corresponding input ports of the crossbar module 310*b*. Moreover, the crossbar modules 310*a* and 310*b* may enable feedback connections 318 between one or more output ports of the crossbar module 310*b* and corresponding input ports of the crossbar module 310*a*. The configuration of the crossbar modules 310*a* and/or 310*b* may result in one or more processing paths being configured within the processing network 300 in accordance with the manner and/or order in which video data is to be processed.

The MFD module 302 may be operable to read video data from memory and provide such video data to the crossbar module 310*a*. The video data read by the MFD module 302 may have been stored in memory after being generated by an MPEG encoder (not shown). Each VFD module 304 may be operable to read video data from memory and provide such video data to the crossbar module 310. The video data read by the VFD module 304 may have been stored in memory in connection with one or more operations and/or processes associated with the processing network 300. The HDMI module 306 may be operable to provide a live feed of high-definition video data to the crossbar module 310*a*. The HDMI module 306 may comprise a buffer (not shown) that may enable the HDMI module 306 to receive the live feed at one data rate and provide the live feed to the crossbar module 310*a* at another data rate.

Each SCL module 308 may be operable to scale video data received from the crossbar module 310*a* and provide the scaled video data to the crossbar module 310*b*. The MAD module 312 may be operable to perform motion-adaptive deinterlacing operations on interlaced video data received from the crossbar module 310*a*, including operations related to inverse telecine (IT), and provide progressive video data to the crossbar module 310*b*. The DNR module 314 may be operable to perform artifact reduction operations on video data received from the crossbar module 310a, including block noise reduction and mosquito noise reduction, for example, and provide the noise-reduced video data to the crossbar module 310b. In some embodiments of the invention, the operations performed by the DNR module 314 may be utilized before the operations of the MAD module 312 and/or the operations of the SCL module 308.

Each CAP module 320 may be operable to capture video data from the crossbar module 310b and store the captured video data in memory. Each of the CMP modules 322a and 322b may be operable to combine or mix video data received from the crossbar module 310b. Moreover, each of the CMP modules 322a and 322b may be operable to combine or mix video data received from the crossbar module 310b with graphics data received from a corresponding one of the GFD modules 324a and 324b. For example, the CMP module 322a may be provided with a graphics feed, Gfxa, from the GFD module 324a for mixing with video data received from the crossbar module 310b. Similarly, the CMP module 322b may be provided with a graphics feed, Gfxb, from the GFD module 324b for mixing with video data received from the crossbar module 310b. Each of the GFD modules 324a and 324b may be operable to read graphics data from memory and provide such graphics data to the corresponding one of the CMP modules 322a and 322b.

The CMP modules 322a and 322b may generate composited video data from the combination of video data and/or graphics data. That is, the CMP modules 322a and 322b may be operable to combine or mix visual elements from separate sources of video data and/or graphics data. In this regard, the composited video data may be in a 3D video output format or in a 2D video output format based on, for example, the output device that is to receive the composited video data. Accordingly, the mixing or combining performed by the CMP modules 322a and 322b may depend on the output format selected, that is, on whether the composited video data is to be in a 3D video output format or in a 2D video output format.

FIGS. 4A and 4B are block diagrams that illustrate exemplary compositors for mixing video data and/or graphics data, in accordance with embodiments of the invention. Referring to FIGS. 4A and 4B, there are shown a compositor module 400a and a compositor module 400b, each of which may be utilized with the processing network 300 described above with respect to FIG. 3. The compositor modules 400a and 400b may receive video data from a video source and may generate composited video data by combining or mixing the video data from that video source with video data from one or more of the additional video sources 1, ..., N. The compositor modules 400a and 400b may also generate composited video data from graphics data feeds, Gfx1, ..., GfxN, of which one or more may be combined or mixed with the video data from the video source and/or with the video data from the one or more of the additional video sources 1, ..., N. In this regard, the graphics data feeds, Gfx1, ..., GfxN, may be associated with one or more graphics feeder modules (not shown). Moreover, the graphics data feeds, Gfx1, ..., GfxN, may be associated with one or more graphics sources that provide the graphics data in those feeds.

Each of the compositor modules 400a and 400b may be configured to select which of the additional video source 1, ..., N, and/or which of the graphics feeds, Gfx1, ..., GfxN, to combine or mix with the video source to generate the composited video data. Such configuration may be dynamically varied based on the content that is to be provided by, for example, the SoC 100 described above. Moreover, each of the compositor modules 400a and 400b may be configured to combine or mix the video data and/or the graphics data in a particular order.

The compositor module 400a in FIG. 4A may be operable to generate an output signal, such as an HDMI signal, for example, that comprises the composited video data generated by the compositor module 400a. Similarly, the compositor module 400b in FIG. 4B may be operable to generate an output signal, such as an NTSC signal, for example, that comprises the composited video data generated by the compositor module 400b.

FIGS. 5A and 5B are diagrams that illustrate a 2D canvas in which to generate 2D composited video data from 2D data, in accordance with embodiments of the invention. Referring to FIG. 5A, there is shown a 2D canvas 500 for combining or mixing video data and/or graphics data when a 2D video output format is selected. For example, when the video output format of a composited video data is to be a 2D video output format, the compositor that generates the composited video data may combine or mix the video data and/or the graphics data in accordance with the layout or structure of the 2D canvas 500. In other words, the 2D canvas 500 illustrates a framework in which the video data and/or the graphics data are arranged when being combined or mixed by the compositor.

Referring to FIG. 5B, there is shown on the left side of the figure, a picture 502 that comprises 2D data 510 and a picture 504 that comprises 2D data 520. The 2D data 510 may be 2D video data or 2D graphics data. The 2D data 520 may be 2D video data or 2D graphics data. The 2D data in the picture 502 and in the picture 504 may be combined or mixed within the 2D canvas 500 as shown on the right side of the figure to generate the 2D composited video data. In this example, the 2D composited video data is generated based on a selected 2D video output format, which corresponds to the framework of the 2D canvas 500.

Figure 6:
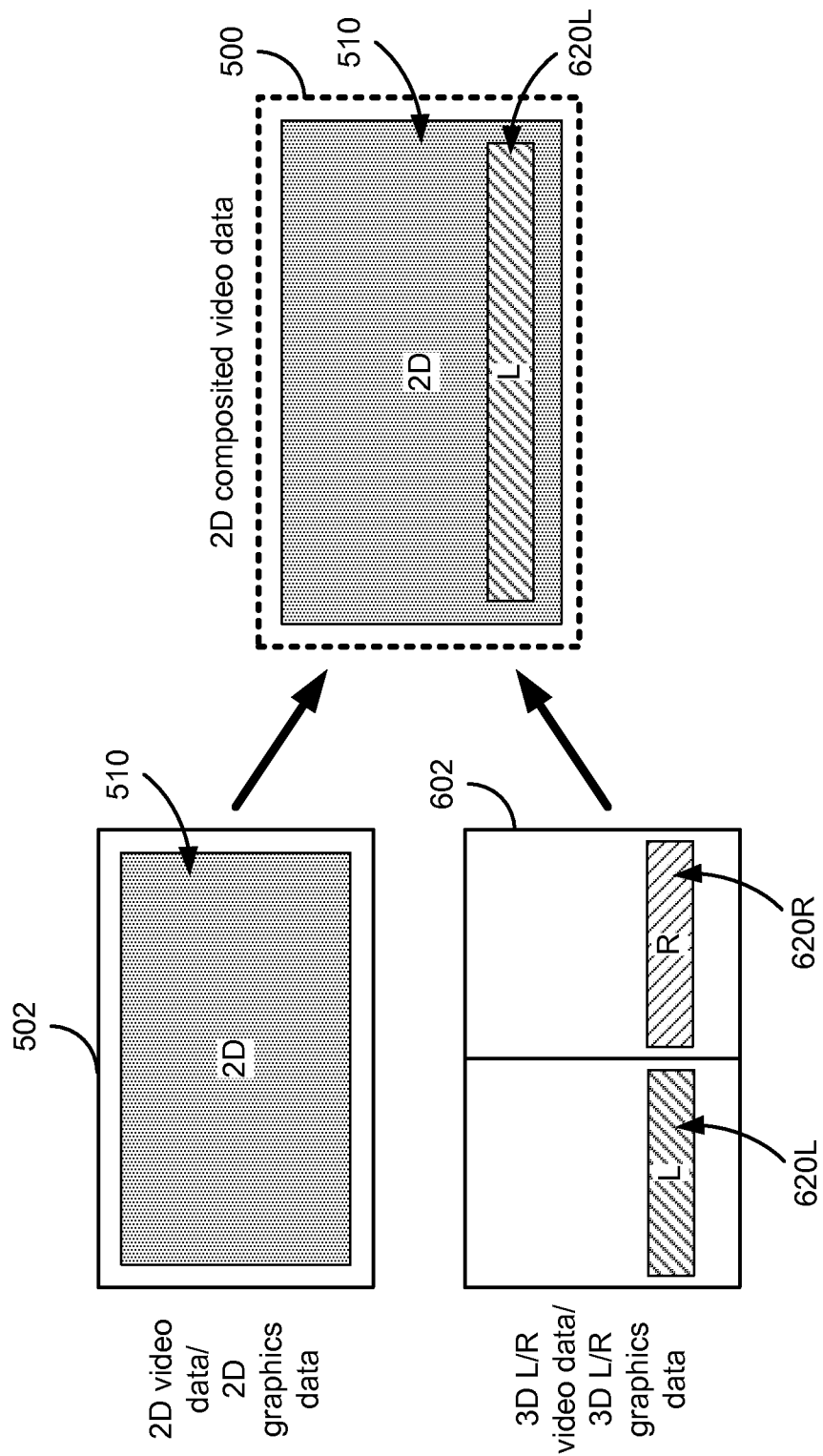
FIG. 6 is a diagram that illustrates a 2D canvas in which to generate 2D composited video data from 2D data and 3D left-and-right (L/R) data, in accordance with an embodiment of the invention.

FIG. 6 is a diagram that illustrates a 2D canvas in which to generate 2D composited video data from 2D data and 3D L/R data, in accordance with an embodiment of the invention. Referring to FIG. 6, there is shown on the left side of the figure, the picture 502 described above with respect to FIG. 5B, and a picture 602, with a 3D L/R format, which comprises 3D data 620L and 3D data 620R. The 3D data 620L corresponds to the left eye content in the picture 602, while the 3D data 620R corresponds to the right eye content in the picture 602. The data in the picture 502 and in the picture 602 may be combined or mixed within the 2D canvas 500 as shown on the right side of the figure with to generate the 2D composited video data. In this example, the 2D composited video data is generated based on a selected 2D video output format, which corresponds to the framework of the 2D canvas 500. Accordingly, the 2D data 510 from the picture 502 may be combined with the 3D data 620L from the picture 602 to generate the 2D composited video data. That is, to achieve a 2D video output format for the 2D composited video data, the right eye content in the picture 602 may be dropped.

Figure 7:
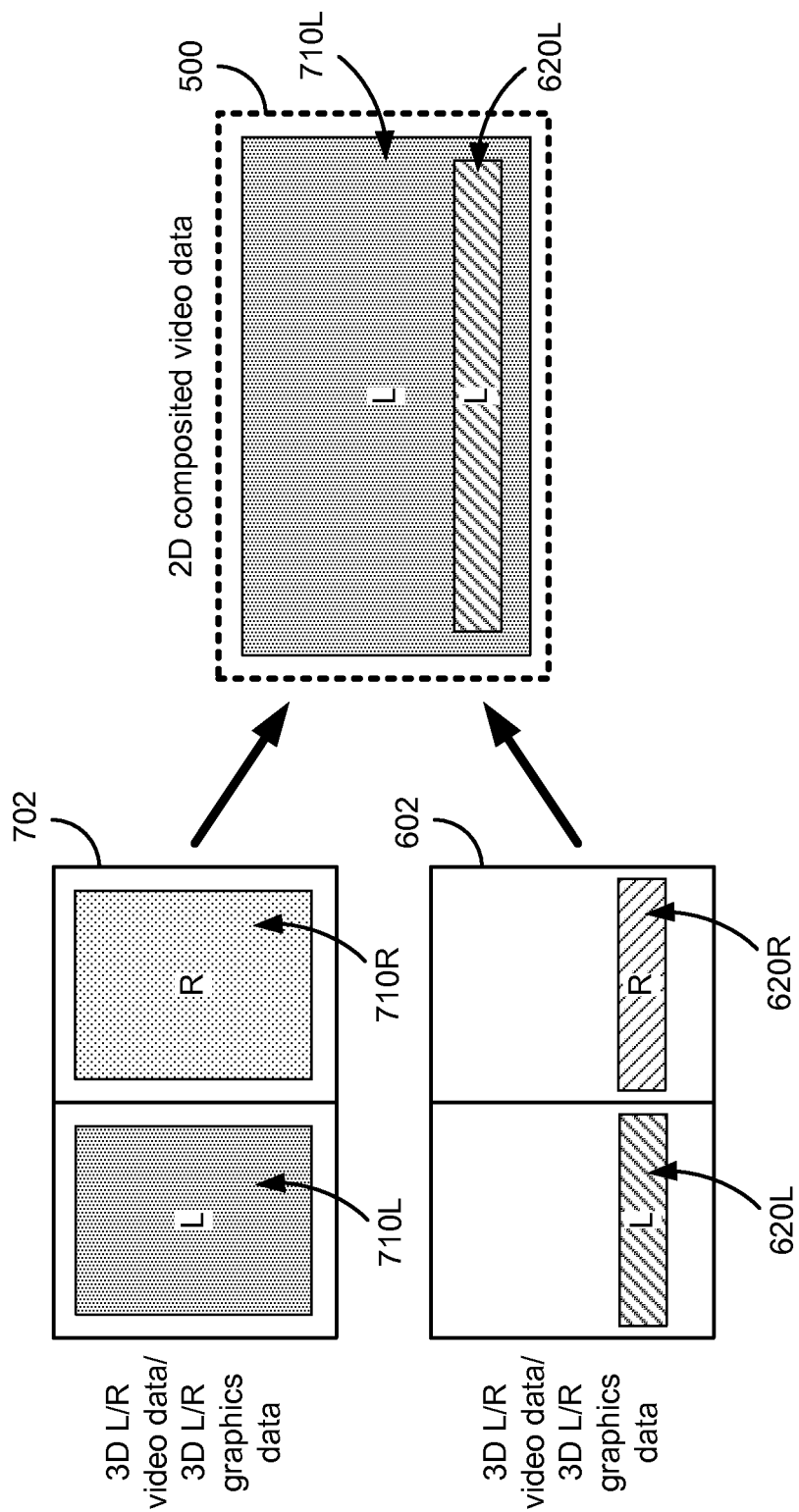
FIG. 7 is a diagram that illustrates a 2D canvas in which to generate 2D composited video data from 3D L/R data, in accordance with an embodiment of the invention.

FIG. 7 is a diagram that illustrates a 2D canvas in which to generate 2D composited video data from 3D L/R data, in accordance with an embodiment of the invention. Referring to FIG. 7, there is shown on the left side of the figure a picture 702, with an L/R format, which comprises 3D data 710L and 3D data 710R, and the picture 602 described above with respect to FIG. 6. The 3D data 710L corresponds to the left eye content in the picture 702, while the 3D data 710R corresponds to the right eye content in the picture 702. The data in the picture 702 and in the picture 602 may be combined or mixed within the 2D canvas 500 as shown on the right side of the figure to generate the 2D composited video data. In this example, the 2D composited video data is generated based on a selected 2D video output format, which corresponds to the framework of the 2D canvas 500. Accordingly, the 3D data 710L from the picture 702 may be combined with the 3D data 620L from the picture 602 to generate the 2D composited video data. That is, to achieve a 2D video output format for the 2D composited video data, the right eye content in both the picture 702 and the picture 602 may be dropped.

Figure 8:
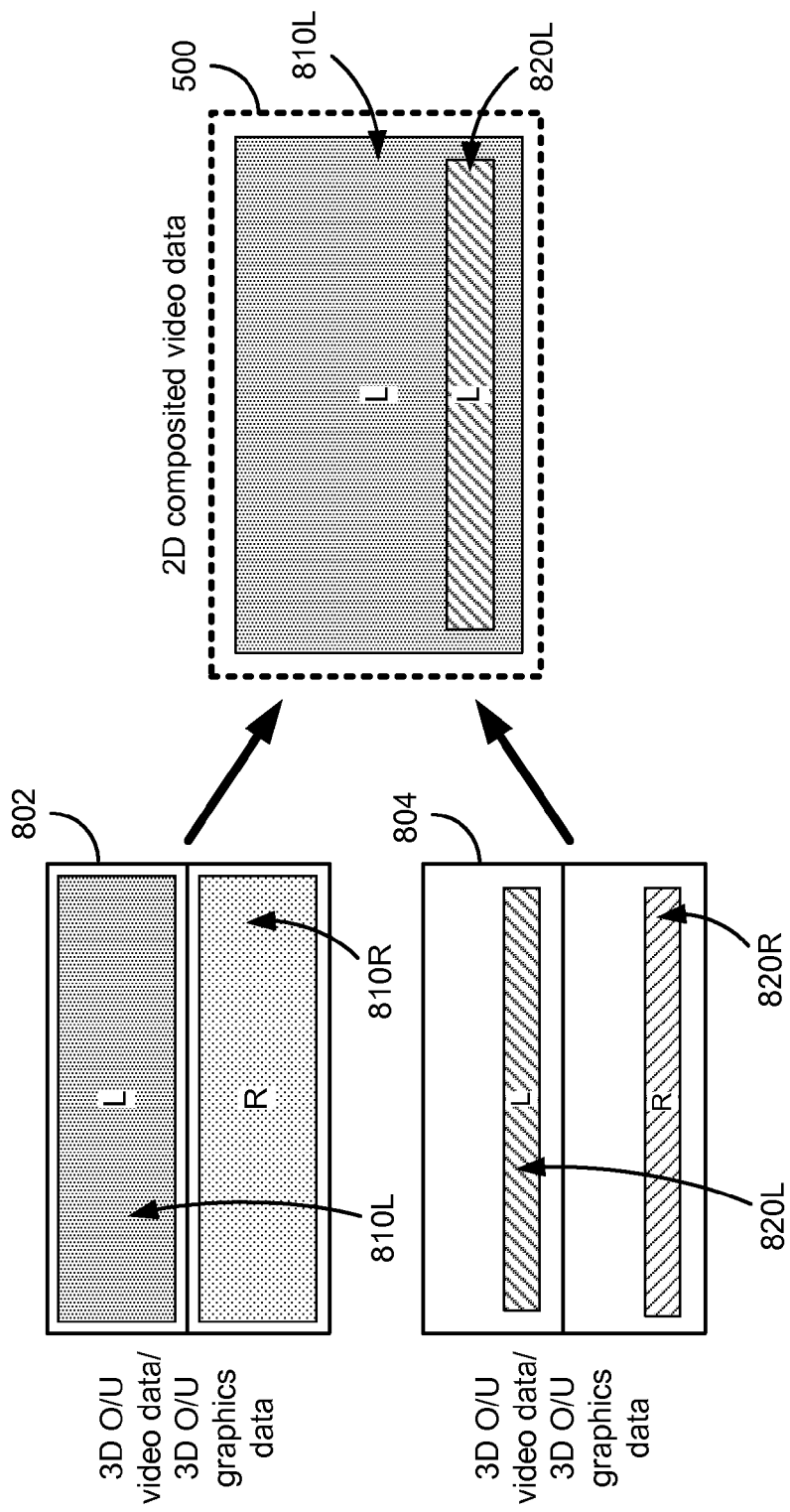
FIG. 8 is a diagram that illustrates a 2D canvas in which to generate 2D composited video data from 3D over-and-under (O/U) data, in accordance with an embodiment of the invention.

FIG. 8 is a diagram that illustrates a 2D canvas in which to generate 2D composited video data from 3D O/U data, in accordance with an embodiment of the invention. Referring to FIG. 8, there is shown on the left side of the figure a picture 802, with an O/U format, which comprises 3D data 810L and 3D data 810R, and a picture 804, also with an O/U format, which comprises 3D data 820L and 3D data 820R. The 3D data 810L corresponds to the left eye content in the picture 802, while the 3D data 810R corresponds to the right eye content in the picture 802. Similarly, the 3D data 820L corresponds to the left eye content in the picture 804, while the 3D data 820R corresponds to the right eye content in the picture 804. The data in the picture 802 and in the picture 804 may be combined or mixed within the 2D canvas 500 as shown on the right side of the figure to generate the 2D composited video data. In this example, the 2D composited video data is generated based on a selected 2D video output format, which corresponds to the framework of the 2D canvas 500. Accordingly, the 3D data 810L from the picture 802 may be combined with the 3D data 820L from the picture 804 to generate the 2D composited video data. That is, to achieve a 2D output format for the 2D composited video data, the right eye content in both the picture 802 and the picture 804 may be dropped.

The various examples shown in FIGS. 5A-8 are provided by way of illustration and not of limitation. Such examples are not intended to be exhaustive and other combinations and/or data formats may be utilized to generate 2D composited video data from one or more sources of video data and/or from one or more sources of graphics data. Moreover, other operations such as format conversion and/or scaling, for example, may be performed in connection with the generation of the 2D composited video data.

FIGS. 9A and 9B are diagrams that illustrate a 3D L/R canvas in which to generate 3D L/R composited video data from 2D data, in accordance with embodiments of the invention. Referring to FIG. 9A, there is shown a 3D L/R canvas 900 for combining or mixing video data and/or graphics data when a 3D L/R video output format is selected. The 3D L/R canvas 900 may have a left canvas 900L and a right canvas 900R. When an output format of a composited video data is to be a 3D L/R video output format, the compositor that generates the composited video data may combine or mix the video data and/or the graphics data in accordance with the layout or structure of the 3D L/R canvas 900. In other words, the 3D L/R canvas 900 illustrates a framework in which the video data and/or the graphics data are arranged when being combined or mixed by the compositor.

Referring to FIG. 9B, there is shown on the left side of the figure the picture 502 and the picture 504 described above with respect to FIG. 5B. The 2D data in the picture 502 and in the picture 504 may be combined or mixed within the 3D L/R canvas 900 as shown on the right side of the figure to generate the 3D L/R composited video data. In this example, the 3D L/R composited video data is generated based on a selected 3D L/R video output format, which corresponds to the framework of the 3D L/R canvas 900. To generate the 3D L/R composited video data in the 3D L/R video output format, the 2D data 510 and the 2D data 520 may be repeated in the 3D L/R canvas 900. That is, the 2D data 510 from the picture 502 may be utilized in generating the left portion of the 3D L/R composited video data in the left canvas 900L and also in generating the right portion of the 3D L/R composited video data in the right canvas 900R. Similarly, the 2D data 520 from the picture 504 may be utilized to generate the left portion of the 3D L/R composited video data in the left canvas 900L and also to generate the right portion of the 3D L/R composited video data in the right canvas 900R.

Figure 10:
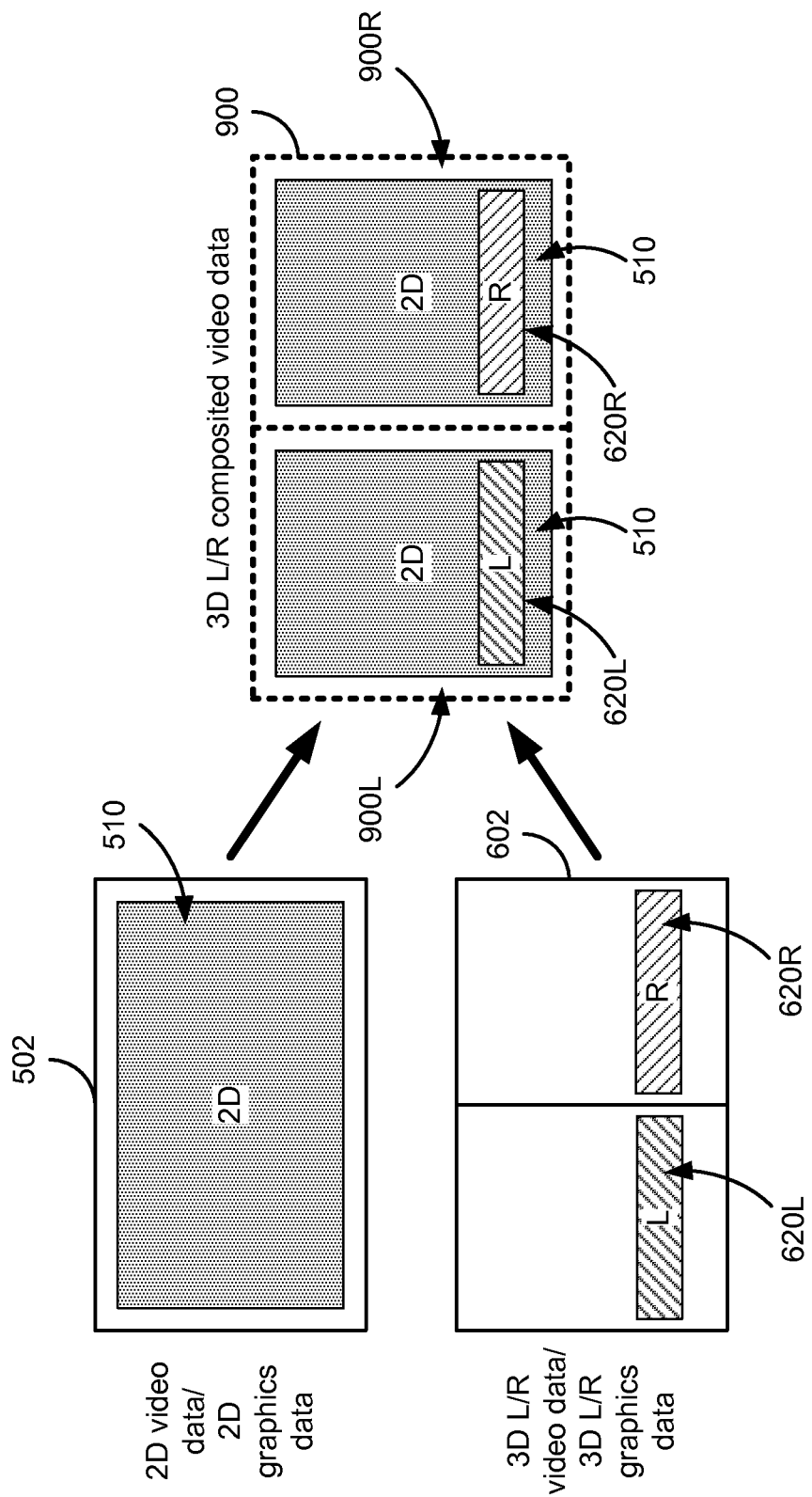
FIG. 10 is a diagram that illustrates a 3D L/R canvas in which to generate 3D L/R composited video data from 2D data and 3D L/R data, in accordance with an embodiment of the invention.

FIG. 10 is a diagram that illustrates a 3D L/R canvas in which to generate 3D L/R composited video data from 2D data and 3D L/R data, in accordance with an embodiment of the invention. Referring to FIG. 10, there is shown on the left side of the figure the picture 502 described above with respect to FIG. 5B and the picture 602 described above with respect to FIG. 6. The data in the picture 502 and in the picture 602 may be combined or mixed within the 3D L/R canvas 900 as shown on the right side of the figure to generate the 3D L/R composited video data. In this example, the 3D L/R composited video data is generated based on a selected 3D L/R video output format, which corresponds to the framework of the 3D L/R canvas 900. To generate the 3D L/R composited video data in the 3D L/R video output format, the 2D data 510 may be repeated in the 3D L/R canvas 900. That is, the 2D data 510 from the picture 502 may be utilized to generate the left portion of the 3D L/R composited video data in the left canvas 900L and also to generate the right portion of the 3D L/R composited video data in the right canvas 900R. Moreover, the 3D data 620L and the 3D data 620R from the picture 602 may be utilized to respectively generate the left portion of the 3D L/R composited video data in the left canvas 900L and the right portion of the 3D L/R composited video data in the right canvas 900R.

Figure 11:
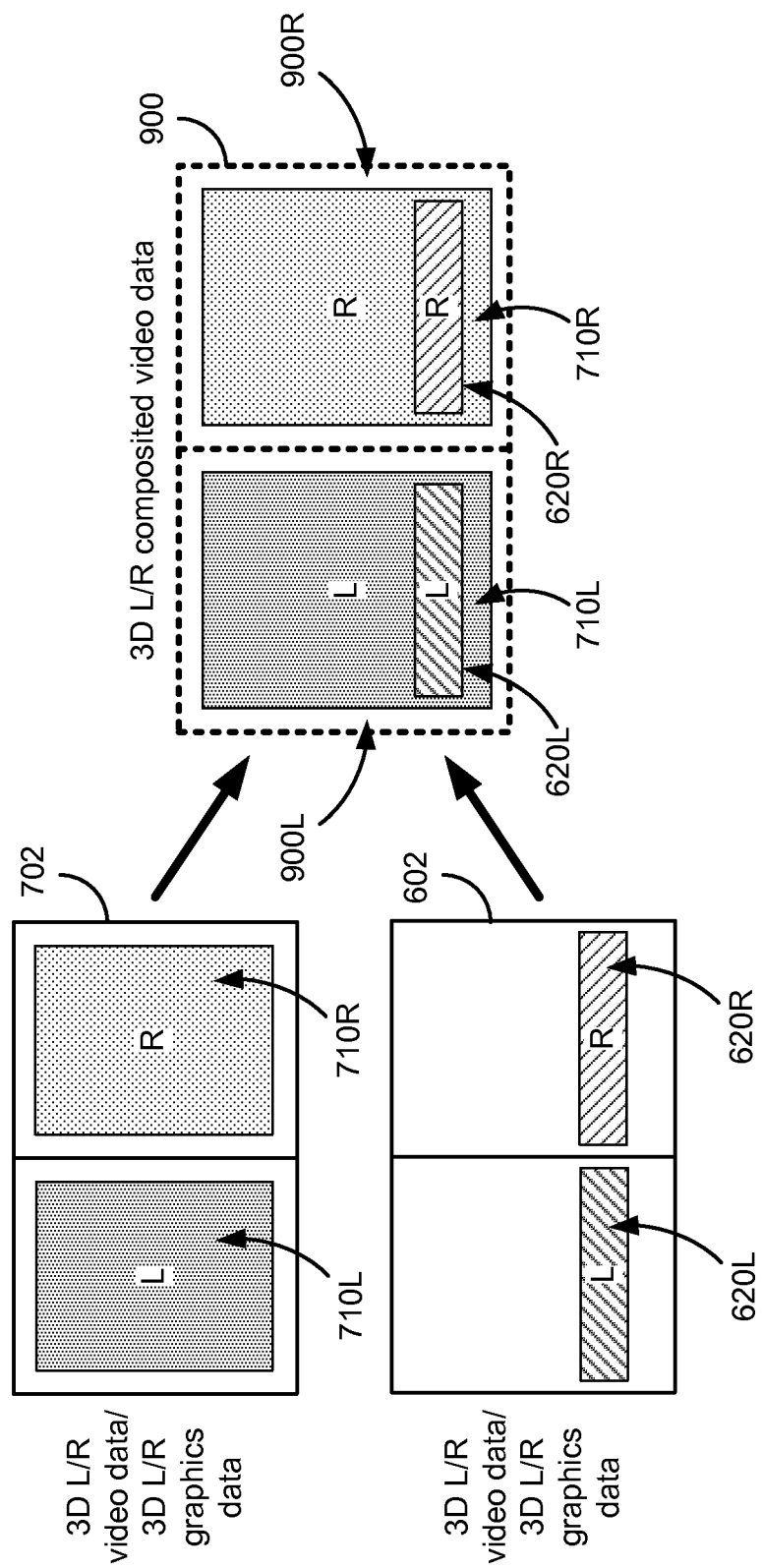
FIG. 11 is a diagram that illustrates a 3D L/R canvas in which to generate 3D L/R composited video data from 3D L/R data, in accordance with an embodiment of the invention.

FIG. 11 is a diagram that illustrates a 3D L/R canvas in which to generate 3D L/R composited video data from 3D L/R data, in accordance with an embodiment of the invention. Referring to FIG. 11, there is shown on the left side of the figure the picture 702 described above with respect to FIG. 7 and the picture 602 described above with respect to FIG. 6. The data in the picture 702 and in the picture 602 may be combined or mixed within the 3D L/R canvas 900, as shown on the right side of the figure, to generate the 3D L/R composited video data. In this example, the 3D L/R composited video data is generated based on a selected 3D L/R video output format, which corresponds to the framework of the 3D L/R canvas 900. To generate the 3D L/R composited video data in the 3D L/R video output format, the 3D data 710L and the 3D data 710R from the picture 702 may be utilized to respectively generate the left portion of the 3D L/R composited video data in the left canvas 900L and the right portion of the 3D L/R composited video data in the right canvas 900R. Moreover, the 3D data 620L and the 3D data 620R from the picture 602 may be utilized to respectively generate the left portion of the 3D L/R composited video data in the left canvas 900L and the right portion of the 3D L/R composited video data in the right canvas 900R.

FIGS. 12A and 12B are diagrams that illustrate a 3D O/U canvas in which to generate 3D composited video data from 3D O/U data, in accordance with embodiments of the invention. Referring to FIG. 12A, there is shown a 3D O/U canvas 1200 for combining or mixing video data and/or graphics data when a 3D O/U video output format is selected. The 3D O/U canvas 1200 may have a left canvas 1200L and a right canvas 1200R. When an output format of a composited video data is to be a 3D O/U output format, the compositor that generates the composited video data may combine or mix the video data and/or the graphics data in accordance with the layout or structure of the 3D O/U canvas 1200. In other words, the 3D O/U canvas 1200 illustrates a framework in which the video data and/or the graphics data are arranged when being combined or mixed by the compositor.

Referring to FIG. 12B, there is shown on the left side of the figure the picture 802 and the picture 804 described above with respect to FIG. 8. The 3D data in the picture 802 and in the picture 804 may be combined or mixed within the 3D O/U canvas 1200 as shown on the right side of the figure to generate the 3D O/U composited video data. In this example, the 3D O/U composited video data is generated based on a selected 3D O/U video output format, which corresponds to the framework of the 3D O/U canvas 1200. To generate the 3D O/U composited video data in the 3D O/U video output format, the 3D data 810L and the 3D data 810R from the picture 802 may be utilized to respectively generate the left portion of the 3D O/U composited video data in the left canvas 1200L and the right portion of the 3D O/U composited video data in the right canvas 1200R. Moreover, the 3D data 820L and the 3D data 830R from the picture 804 may be utilized to respectively generate the left portion of the 3D O/U composited video data in the left canvas 1200L and the right portion of the 3D O/U composited video data in the right canvas 1200R.

The various examples shown in FIGS. 9A-12B are provided by way of illustration and not of limitation. Such examples are not intended to be exhaustive and other combinations and/or data formats may be utilized to generate 3D L/R composited video data and 3D O/U composited video data from one or more sources of video data and/or from one or more sources of graphics data. Moreover, other operations such as format conversion and/or scaling, for example, may be performed in connection with the generation of the 3D L/R composited video data and 3D O/U composited video data.

FIGS. 13A and 13B are diagrams that illustrate the mapping of video data and/or graphics data to one or more windows and the ordering of such windows in a compositor to generate 2D composited video data, in accordance with embodiments of the invention. Referring to FIG. 13A, there is shown the 2D canvas 500 described above with respect to FIG. 5A. Also shown are windows 1, 2, and 3 that may be associated with the 2D data from pictures 1310, 1320, and 1330, respectively. The 2D data from the pictures 1310, 1320, and 1330 may be from one or more video sources and/or from one or more graphics sources. Moreover, the 2D data from one or more of the pictures 1310, 1320, and 1330 may be based on 3D data as described above with respect to FIGS. 6, 7, and 8.

The 2D composited video data 1340 shown at the bottom of the figure may be generated by a compositor through the combination or mixing of the 2D data from the pictures 1310, 1320, and 1330 in accordance with the order of the windows 1, 2, and 3. For example, the 2D data associated with the window 3 may be placed at the front (e.g., foreground), the 2D data associated with the window 2 may be placed behind that of the window 3, and the 2D data associated with the window 1 may be placed in the back (e.g., background).

Referring to FIG. 13B, the compositor may be operable to rearrange the order of the windows 1, 2, and 3. For example, the 2D composited video data 1350 shown at the bottom of the figure may be generated by having the 2D data associated with the window 2 moved to the front, the 2D data associated with the window 3 placed behind that of the window 2, and the 2D data associated with the window 1 remaining in the back.

The examples in FIGS. 13A and 13B are provided by way of illustration and not of limitation. Fewer or more windows than those shown in FIGS. 13A and 13B may be utilized based on the number of video sources and/or graphics sources providing data for mixing. Moreover, the order of one or more windows may be dynamically varied by the compositor to generate the appropriate 2D composited video data.

Figure 14B:
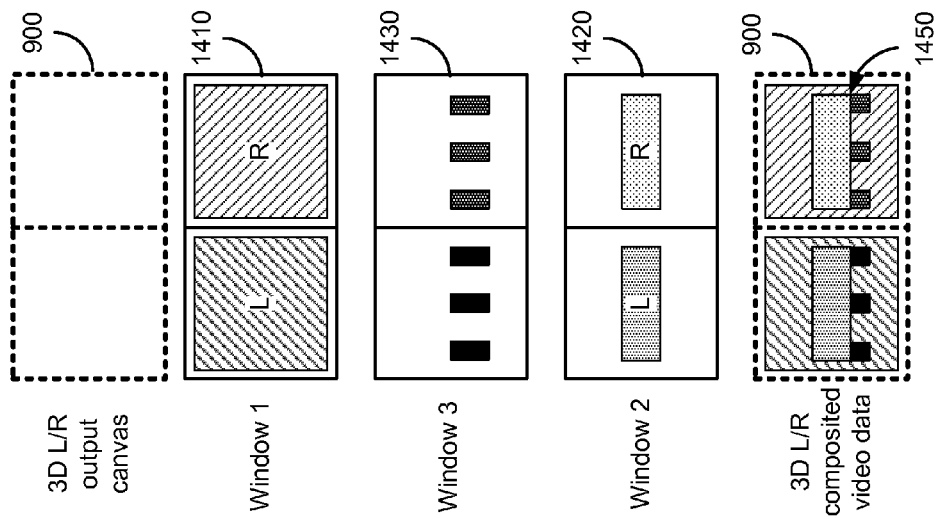
FIGS. 14A and 14B are diagrams that illustrate the mapping of video data and/or graphics data to one or more windows and the ordering of such windows in a compositor to generate 3D L/R composited video data, in accordance with embodiments of the invention.
Figure 14A:
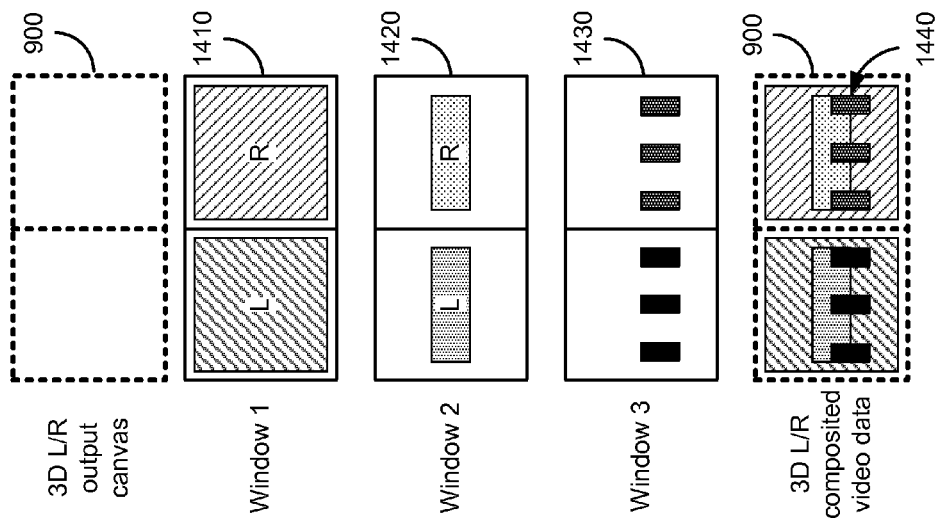

FIGS. 14A and 14B are diagrams that illustrate the mapping of video data and/or graphics data to one or more windows and the ordering of such windows in a compositor to generate 3D L/R composited video data, in accordance with embodiments of the invention. Referring to FIG. 14A, there is shown the 3D L/R canvas 900 described above with respect to FIG. 9A. Also shown are windows 1, 2, and 3 that may be associated with the 3D L/R data from pictures 1410, 1420, and 1430, respectively. The 3D L/R data from the pictures 1410, 1420, and 1430 may be from one or more video sources and/or from one or more graphics sources. Moreover, the 3D L/R data from one or more of the pictures 1410, 1420, and 1430 may be based on 2D data as described above with respect to FIGS. 9B and 10.

The 3D L/R composited video data 1440 shown at the bottom of the figure may be generated by a compositor through the combination or mixing of the 3D L/R data from the pictures 1410, 1420, and 1430 in accordance with the order of the windows 1, 2, and 3. For example, the 3D L/R data associated with the window 3 may be placed at the front, the 3D L/R data associated with the window 2 may be placed behind that of the window 3, and the 3D L/R data associated with the window 1 may be placed in the back.

Referring to FIG. 14B, the compositor may be operable to rearrange the order of the windows 1, 2, and 3. For example, the 3D L/R composited video data 1450 shown at the bottom of the figure may be generated by having the 3D L/R data associated with the window 2 placed at the front, the 3D L/R data associated with the window 3 placed behind that of the window 2, and the 3D L/R data from the window 1 remaining in the back.

The examples in FIGS. 14A and 14B are provided by way of illustration and not of limitation. Fewer or more windows than those shown in FIGS. 14A and 14B may be utilized based on the number of video sources and/or graphics sources providing data for mixing. The order of one or more windows may be dynamically varied by the compositor to generate the appropriate 3D L/R composited video data. Moreover, a similar approach to that described in FIGS. 14A and 14B may be utilized to control the order in which data is combined to generate a 3D O/U composited video data and/or any other type of 3D-formatted composited video data.

Figure 15:
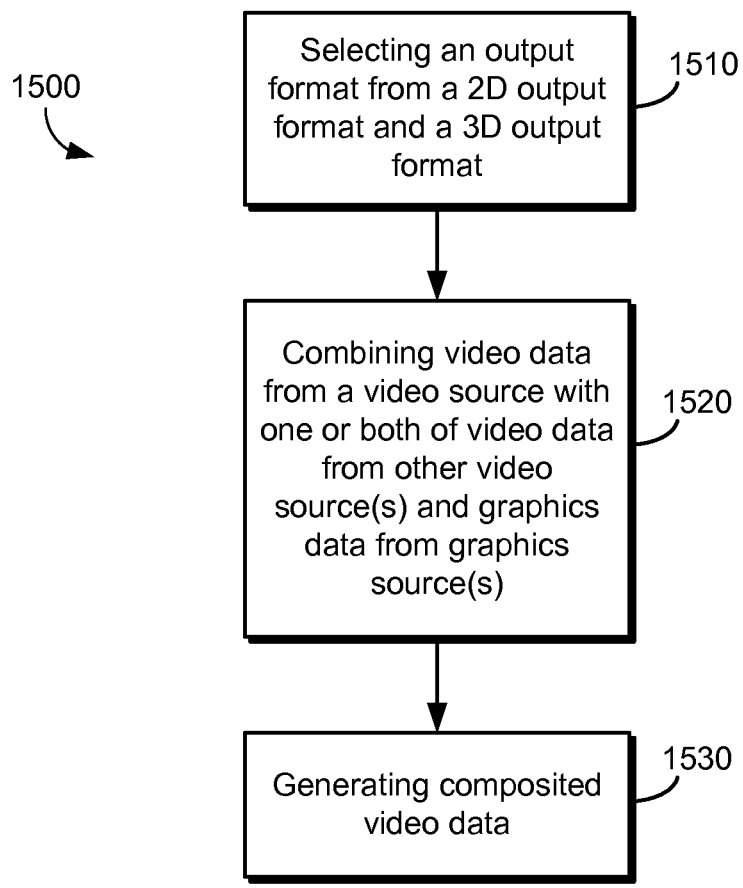
FIG. 15 is a flow chart that illustrates steps for generating composited video data in a compositor, in accordance with an embodiment of the invention.

FIG. 15 is a flow chart that illustrates steps for generating composited video data in a compositor, in accordance with an embodiment of the invention. Referring to FIG. 15, there is shown a flow chart 1500 in which, at step 1510, a video output format for a composited video data to be generated by a compositor is selected from a 2D video output format and a 3D video output format. The 3D video output format may be, for example, a 3D L/R video output format or a 3D O/U video output format. Such format selection may be based on the type of output device to which the composited video data is to be provided. For example, a display device that only supports 2D video may require that the output from a video processor, such as the SoC 100, be formatted as a 2D video output. In another example, a display device that supports 2D video and 3D video may allow the output from the video processor to be formatted as a 2D video output or as a 3D video output.

At step 1520, the video data from a video source may be combined or mixed in the compositor with the video data from one or more additional video sources and/or with the graphics data from one or more graphics sources. The combination may be based on the video output format selected.

For example, the combination may be performed based on a 2D canvas, such as the 2D canvas 500, or based on a 3D canvas, such as the 3D L/R canvas 900 or the 3D O/U canvas 1200, in accordance with the video output format selected. At step 1530, the combined data may be utilized to generate the composited video data.

In some instances, changing the video output format may be noticeable to a user of a display device. In accordance with various embodiments of the invention, the compositor is operable to continuously provide a video output that is 2D-formatted even when the video data and/or the graphics data may comprise 3D-formatted data, thereby reducing a need to change the video output format. Similarly, video output format change may be reduced when the compositor is capable of continuously providing a video output format that is 3D-formatted even when the video data and/or the graphics data may comprise 2D-formatted data.

Figure 16:
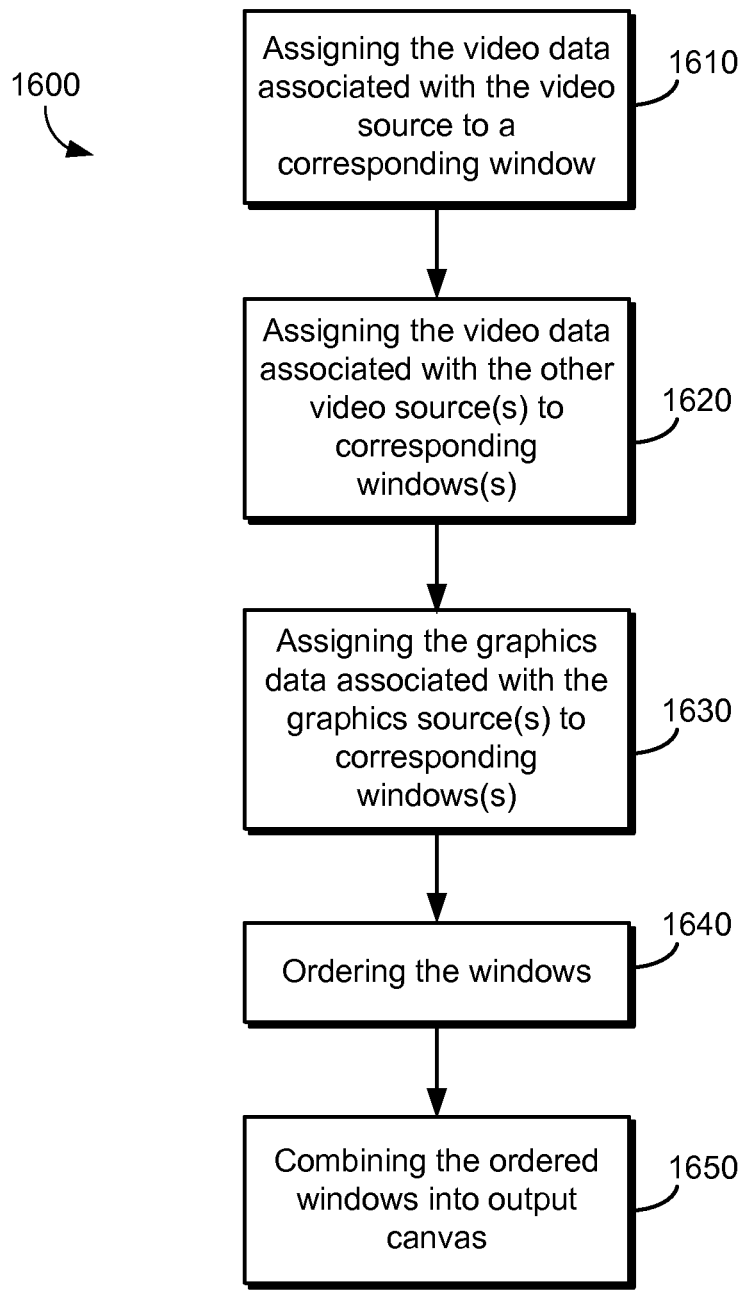
FIG. 16 is a flow chart that illustrates steps for combining video data and/or graphics data in a compositor, in accordance with an embodiment of the invention.

FIG. 16 is a flow chart that illustrates steps for combining video data and/or graphics data in a compositor, in accordance with an embodiment of the invention. Referring to FIG. 16, there is shown a flow chart 1600, in which at step 1610, the video data from a video source that is to be combined in a compositor may be assigned to a corresponding window. At step 1620, the video data associated with one or more additional sources that are to be combined in the compositor may also be assigned to corresponding windows. At step 1630, the graphics data associated with one or more graphics sources that are to be combined in the compositor may also be assigned to corresponding windows. Examples of the windows assignments described in steps 1610, 1620, and 1630 are described above with respect to FIGS. 13A-14B.

At step 1640, the compositor may be provided with information regarding the order in which the video data and/or the graphics data are to be combined. That is, the compositor may be provided with information regarding which video data and/or graphics data is to be placed at the front of the composited video data, which video data and/or graphics data is to be placed in the back of the composited video data, and the order in which to place any video data and/or graphics data between the front and the back of the composited video data. The ordering of the video data and/or the graphics data may be managed by controlling the order of the windows assigned to the video data and/or graphics data.

At step 1650, once the windows and corresponding video data and/or graphics data are properly ordered, the compositor may combine the contents associated with the windows to generate the composited video data. The combination may be carried out in accordance with a canvas that corresponds to the video output format selected.

Various embodiments of the invention relate to a video processor that is operable to select an output format from a 2D video output format and a 3D video output format. The video processor may correspond to at least a portion of the SoC 100 described above with respect to FIG. 1, for example. In this regard, the SoC 100 may be operable to generate composited video data by combining video data from a video source and video data from one or more additional video sources and/or graphics data from one or more graphics sources, wherein the combination is based on the selected output format. The SoC 100 may be operable to select an order in which to combine the video data from the video source and one or both of the video data from the one or more additional video sources and the graphics data from the one or more graphics sources. The video data from the video source may comprise one or both of 2D video data and 3D video data. The video data from the one or more additional video sources may comprise one or both of 2D video data and 3D video data. The graphics data from the one or more graphics sources may comprise one or both of 2D graphics data and 3D graphics data. A compositor, such as the compositors 322a and 322b in FIG. 3 and/or the compositors 400a and 400b in FIGS. 4A and 4B, may be utilized to generate the composited video data as described above. The SoC 100 may be operable to generate one or both of an HDMI signal comprising the composited video data and an NTSC signal comprising the composited video data.

The SoC 100 may be operable to convert a format of one or more of the video data from the video source, the video data from the one or more additional video sources, and the graphics data from the one or more graphics sources, wherein the format conversion is based on the selected output format. For example, the format conversion may be a 2D-to-3D format conversion that comprises a conversion from 2D video data to 3D L/R video data or a conversion from 2D graphics data to 3D L/R graphics data. In another example, the format conversion may be a 2D-to-3D format conversion that comprises a conversion from 2D video data to 3D O/U video data or a conversion from 2D graphics data to 3D O/U graphics data. In yet another example, the format conversion may be a 3D-to-2D format conversion that comprises a conversion from 3D video data to 2D video data or a conversion from 3D graphics data to 2D graphics data.

In another embodiment of the invention, a non-transitory machine and/or computer readable storage and/or medium may be provided, having stored thereon a machine code and/or a computer program having at least one code section executable by a machine and/or a computer, thereby causing the machine and/or computer to perform the steps as described herein for mixing video and graphics.

Accordingly, the present invention may be realized in hardware, software, or a combination of hardware and software. The present invention may be realized in a centralized fashion in at least one computer system or in a distributed fashion where different elements may be spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method, comprising:
   selecting a 2D video output format or a 3D video output format;
   selecting an order for windows of a video composition canvas corresponding to the selected video output format, the order of each window determining content overlap in a composited video data, the content overlap preventing display of at least a portion of the content;
   mapping video data from a video source, and at least one of video data from additional video sources and graphics data from graphics sources to respective windows of the video composition canvas; and
   generating the composited video data, by combining the windows of the video composition canvas based on the selected order, wherein the combination is based on a layout of the video composition canvas that corresponds to the selected video output format,
   wherein the generating step includes converting a format of the content to an intermediate format different from the video output format prior to generating the composited video data, generating the composited video data in the intermediate format, and converting the composited video data to the selected output format.

2. The method of claim 1, wherein the video data from the video source includes at least one of 2D video data and 3D video data.

3. The method of claim 1, wherein the video data from the additional video sources includes at least one of 2D video data and 3D video data.

4. The method of claim 1, wherein the graphics data from the graphics sources includes at least one of 2D graphics data and 3D graphics data.

5. The method of claim 1, further comprising:
   generating at least one of a high-definition multimedia interface (HDMI) signal including the composited video data and a National Television System Committee (NTSC) signal including the composited video data.

6. The method of claim 1, further comprising:
   converting a format of at least one of the video data from the video source, the video data from the additional video sources, and the graphics data from the graphics sources, wherein the format conversion is based on the selected video output format.

7. The method of claim 6, wherein the format conversion is a 2D-to-3D format conversion that includes one of a conversion from 2D video data to 3D left-and-right (L/R) video data and a conversion from 2D graphics data to 3D L/R graphics data.

8. The method of claim 6, wherein the format conversion is a 2D-to-3D format conversion that includes one of a conversion from 2D video data to 3D over-and-under (O/U) video data and a conversion from 2D graphics data to 3D O/U graphics data.

9. The method of claim 6, wherein the format conversion is a 3D-to-2D format conversion that includes one of a conversion from 3D video data to 2D video data and a conversion from 3D graphics data to 2D graphics data.

10. A system, comprising:
    circuitry configured to
    select a 2D video output format or a 3D video output format;
    select an order for windows of a video composition canvas corresponding to the selected video output format, the order of each window determining content overlap in a composited video data, the content overlap preventing display of at least a portion of the content;
    map video data from a video source, and at least one of video data from additional video sources and graphics data from graphics sources to respective windows of the video composition canvas; and
    generate the composited video data, by combining the windows of the video composition canvas based on the selected order, wherein the combination is based on a layout of the video composition canvas that corresponds to the selected video output,
    wherein the circuitry is further configured to convert a format of the content to an intermediate format different from the video output format prior to generating the composited video data, generate the composited video data in the intermediate format, and convert the composited video data to the selected output format.

11. The system of claim 10, wherein the video data from the video source includes at least one of 2D video data and 3D video data.

12. The system of claim 10, wherein the video data from the additional video sources includes at least one of 2D video data and 3D video data.

13. The system of claim 10, wherein the graphics data from the graphics sources includes at least one of 2D graphics data and 3D graphics data.

14. The system of claim 10, wherein the circuitry is further configured to generate at least one of an HDMI signal comprising the composited video data and an NTSC signal comprising the composited video data.

15. The system of claim 10, wherein the circuitry is further configured to convert a format of at least one of the video data from the video source, the video data from the additional video sources, and the graphics data from the graphics sources, wherein the format conversion is based on the selected video output format.

16. The system of claim 15, wherein the format conversion is a 2D-to-3D format conversion that includes one of a conversion from 2D video data to 3D left-and-right (L/R) video data and a conversion from 2D graphics data to 3D L/R graphics data.

17. The system of claim 15, wherein the format conversion is a 2D-to-3D format conversion that includes one of a conversion from 2D video data to 3D over-and-under (O/U) video data and a conversion from 2D graphics data to 3D O/U graphics data.

18. The system of claim 15, wherein the format conversion is a 3D-to-2D format conversion that includes one of a conversion from 3D video data to 2D video data and a conversion from 3D graphics data to 2D graphics data.

19. A non-transitory computer readable medium having stored thereon a program that when executed by a computer causes the computer to execute a method comprising:
    selecting a 2D video output format or a 3D video output format;
    selecting an order for windows of a video composition canvas corresponding to the selected video output format, the order of each window determining content overlap in a composited video data, the content overlap preventing display of at least a portion of the content;
    mapping video data from a video source, and at least one of video data from additional video sources and graphics data from graphics sources to respective windows of the video composition canvas; and
    generating the composited video data, by combining the windows of the video composition canvas based on the selected order, wherein the combination is based on a layout of the video composition canvas that corresponds to the selected video output format, wherein the generating step includes converting a format of the content to an intermediate format different from the video output format prior to generating the composited video data, generating the composited video data in the intermediate format, and converting the composited video data to the selected output format.

20. The method of claim 7, wherein in the conversion from 2D video data to 3D left-and-right (L/R) video data, left video data and the right video data are in different frames of the video data.

* * * * *